(12) United States Patent
Yamamura et al.

(10) Patent No.: US 7,259,964 B2
(45) Date of Patent: Aug. 21, 2007

(54) DISPLAY DEVICE

(75) Inventors: Shinji Yamamura, Chiba (JP);
Yoshinori Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 11/236,561

(22) Filed: Sep. 28, 2005

(65) Prior Publication Data

US 2006/0070280 A1 Apr. 6, 2006

(30) Foreign Application Priority Data

Oct. 4, 2004 (JP) ............................. 2004-291636

(51) Int. Cl.
*H05K 7/20* (2006.01)

(52) U.S. Cl. ...................... 361/697; 361/690; 361/692; 361/695; 313/11; 313/40; 313/45; 313/46; 349/58; 349/61; 349/62; 349/63; 349/64; 349/65; 362/373; 345/84; 345/87

(58) Field of Classification Search ................ 361/681, 361/683, 687, 690–697, 704–719, 808, 809; 361/825, 831, 724–727; 174/254, 260; 165/802, 165/803, 122, 126, 104.32, 104.33, 104.34; 257/718–727; 349/60–65, 58, 161, 20; 345/84, 87; 362/31, 373; 313/11, 13, 17, 313/22–25, 35, 36, 44, 46, 27
See application file for complete search history.

(56) References Cited

U.S. PATENT DOCUMENTS 6,522,543 B2 * 2/2003 Kurihara et al. ............ 361/704
6,693,682 B2 * 2/2004 Fujishiro et al. ............. 349/65
6,774,872 B1 * 8/2004 Kawada et al. .............. 345/60
6,825,828 B2 * 11/2004 Burke et al. ................ 345/101
7,072,179 B1 * 7/2006 Curran et al. ............... 361/687
7,128,447 B2 * 10/2006 Chen .......................... 362/373
7,157,838 B2 * 1/2007 Thielemans et al. .......... 313/35
7,164,224 B2 * 1/2007 Hayashi et al. ............... 313/27
2004/0264130 A1 * 12/2004 Liang .......................... 361/690
2005/0073639 A1 * 4/2005 Pan ............................. 349/161

FOREIGN PATENT DOCUMENTS

JP         02003084280 A  *  3/2003

* cited by examiner

Primary Examiner—Michael Datskovskiy
(74) *Attorney, Agent, or Firm*—Oblon, Spivak, McClelland, Maier & Neustadt, P.C.

(57) ABSTRACT

A display device includes a main display unit including a casing, a display panel, a light source for emitting light as backlight, and a reflector for reflecting the light toward the display panel; a heat sink for cooling the light source, the heat sink having a plurality of fins; and a frame provided to cover at least an upper face and right and left side faces of the casing from the outside, and having a top plate disposed above the upper face and a pair of side plates disposed beside the right and left side faces. A radiation hole is provided in the upper face of the casing so that at least heat conducted from the light source to the heat sink radiates therethrough, and a radiation space is provided between the top plate of the frame and the upper face of the casing.

6 Claims, 15 Drawing Sheets

DISPLAY DEVICE

CROSS REFERENCES TO RELATED APPLICATIONS

The present invention contains subject matter related to Japanese Patent Application JP 2004-291636 filed in the Japanese Patent Office on Oct. 4, 2004, the entire contents of which are incorporated herein by reference.

BACKGROUND OF THE INVENTION

1. Field of the Invention

The present invention relates to a display device, and more particularly, to a technique for enhancing cooling efficiency in the display device.

2. Description of the Related Art

Display devices are used in televisions, personal computers, and other apparatuses. In some display devices, an image is displayed on a display panel such as a liquid crystal display panel, and light is emitted as backlight from a light source disposed on the rear side of or beside the display panel onto the display panel, as disclosed in, for example, Japanese Unexamined Patent Application Publication No. 8-82797.

SUMMARY OF THE INVENTION

In this type of display device, when the temperature of the light source rises during driving, the operation of the light source becomes unstable. Therefore, it is necessary to cool the light source in order to suppress the temperature rise.

For example, a casing of the display device is provided with air intake holes through which outside air is taken in as cooling air, and radiation holes through which the taken cooling air is released. The light source is cooled by cooling air taken through the air intake holes. The temperature of the cooling air is increased by the cooling, and the cooling air is released from the radiation holes.

In this cooling mechanism, it is necessary to enhance cooling efficiency, and to prevent the user from suffering inconvenience from radiated heat, for example, to prevent the human body from being adversely effected by the heat.

Accordingly, it is desirable to enhance the efficiency of cooling a light source without any influence on a user.

A display device according to an embodiment of the present invention includes a main display unit having a casing, a display panel disposed on a front side of the casing, a light source for emitting light serving as backlight, and a reflector for reflecting the light emitted from the light source toward the display panel; a heat sink for cooling the light source, the heat sink having a plurality of fins; and a frame provided to cover at least an upper face and right and left side faces of the casing from the outside, and having a top plate disposed above the upper face and a pair of side plates disposed beside the right and left side faces. A radiation hole is provided in the upper face of the casing so that at least heat conducted from the light source to the heat sink radiates therethrough, and a radiation space is provided between the top plate of the frame and the upper face of the casing.

In the above display device, heat generated by driving of the light source and conducted to the heat sink can be efficiently radiated from the radiation hole provided in the upper face of the casing and the upper space of the main display unit via the heat sink.

Even when the user touches the top plate of the frame, heated cooling air will not be blown against the user. Moreover, the temperature of the top plate does not extremely rise, and therefore, a large amount of heat is prevented from being conducted to the hand of the user.

The frame disposed around the main display unit improves the appearance of the display device.

Preferably, the heat sink is provided on each of right and left sides of the casing. In this case, cooling air can flow from bottom to top, and this enhances cooling efficiency.

Preferably, the display device further includes a fan for taking outside air in as cooling air, and a duct for feeding the cooling air to the heat sink, the duct having one end serving as an air inlet connected to the fan and the other end serving as an air outlet for feeding the cooling air toward the heat sink. In this case, the cooling air is forcedly fed to the heat sink, and this enhances the cooling efficiency.

Preferably, the heat sink is placed so that the fins are arranged in a direction in which the cooling air is blown from the air outlet of the duct, one longitudinal end of the heat sink opposes the air outlet, and the positions of ends of the fins at the longitudinal end of the heat sink are determined in accordance with the distance from the air outlet so that the fin closest to the air outlet is the shortest and the fin farthest from the air outlet is the longest. In this case, cooling air fed through the duct is efficiently supplied between the fins of the heat sink, and the cooling efficiency is enhanced further.

A display device according to another embodiment of the present invention includes a main display unit having a casing, a display panel provided on a front side of the casing to display an image, a light source for emitting light serving as backlight, and a reflector for reflecting the light emitted from the light source toward the display panel; and a frame provided to cover at least a lower face and right and left side faces of the casing from the outside, and having a bottom plate disposed under the lower face and a pair of side plates disposed beside the right and left side faces. An air intake hole is provided in the lower face of the casing to take outside air in as cooling air, and an air intake space is provided between the bottom plate of the frame and the lower face of the casing.

In the above display device, when heat is generated by driving of the light source, outside air is efficiently taken in as cooling air into the casing from the air intake hole through the air intake space between the bottom plate of the frame and the lower face of the casing. This enhances cooling efficiency.

The frame disposed around the main display unit improves the appearance of the display device.

Preferably, a speaker is provided at a lower end of the casing, and has a sound output hole opened downward to output at least low-range sound. In this case, low-range sound can be output downward, and can be emphasized.

The space lying in the lower part of the main display unit can serve not only to take cooling air in, but also to output sound. The space can thus be used efficiently.

DESCRIPTION OF THE PREFERRED EMBODIMENTS

A display device according to an embodiment of the present invention will be described below with reference to the attached drawings. In the following embodiment, the present invention is applied to a display device for use in a personal computer. The present invention is applicable not only to the display device in the personal computer, but also to various display devices mounted in, for example, a television, a PDA (personal digital assistant), a network terminal, a portable information terminal, and a workstation.

Figure 1:
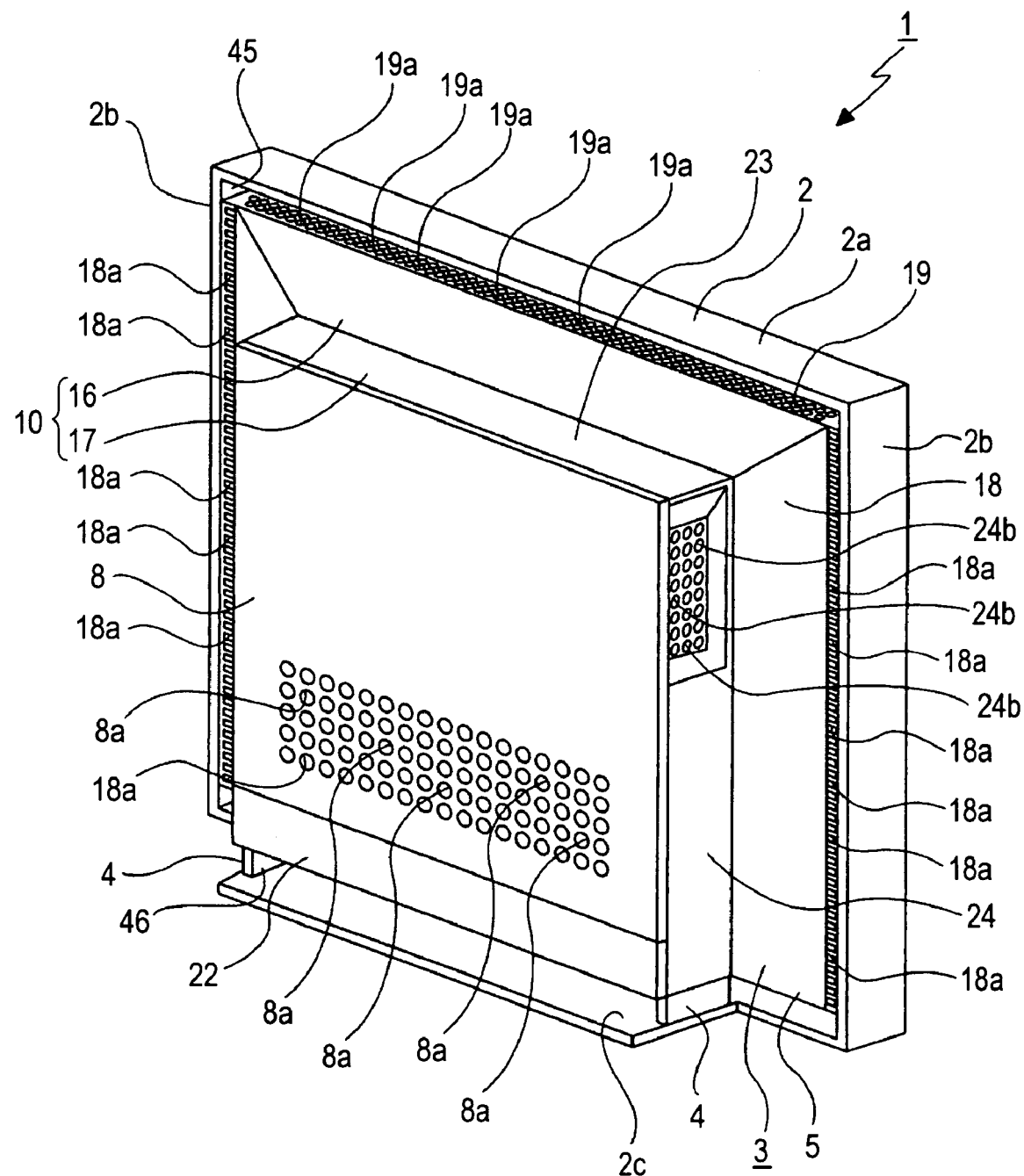
FIG. 1 is a perspective view of a display device according to an embodiment of the present invention.
Figure 2:
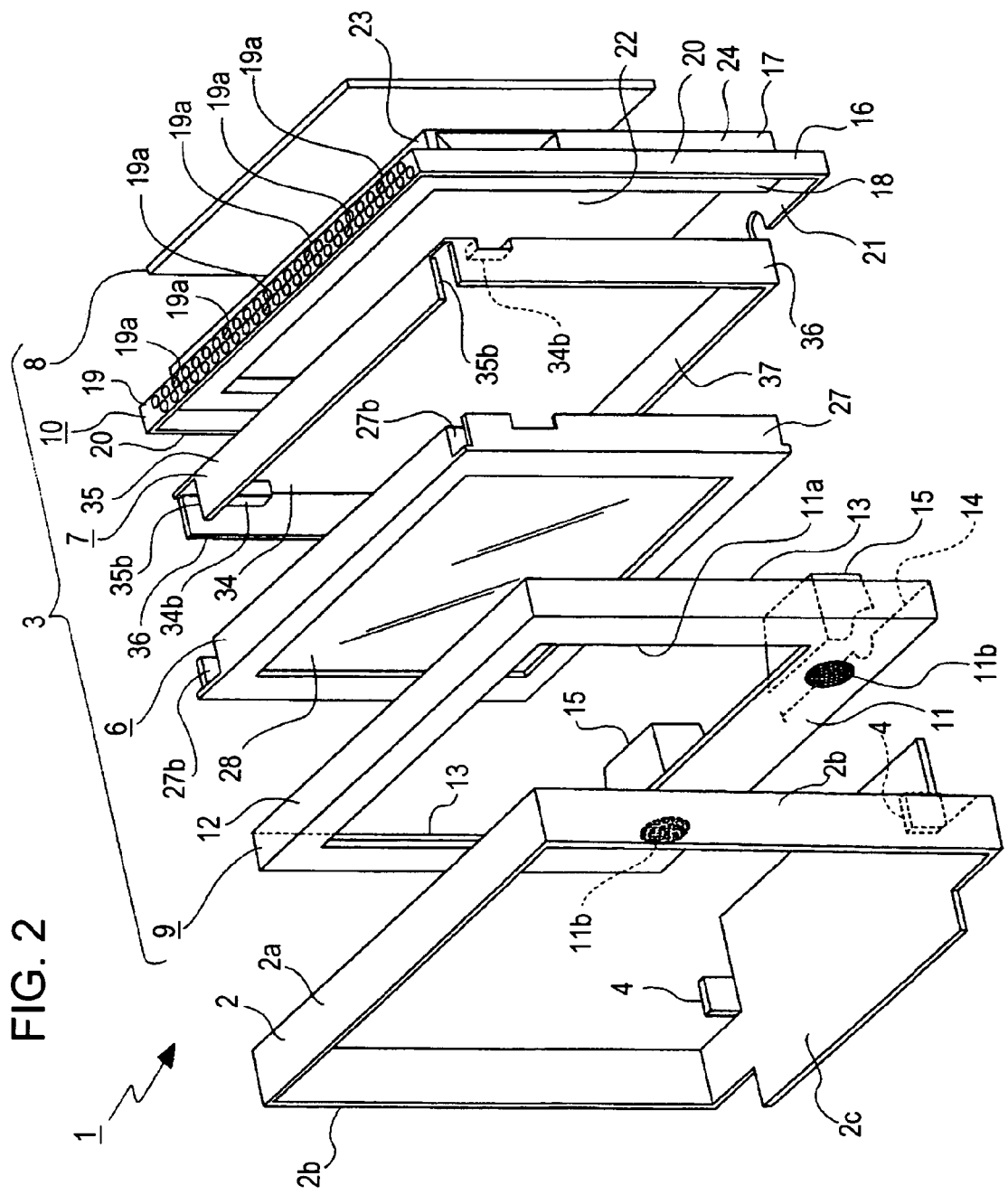
FIG. 2 is an exploded schematic perspective view of the display device.

Referring to FIGS. 1 and 2, a display device 1 according to the embodiment of the present invention includes a frame 2, and a main display unit 3 disposed inside the frame 2.

For example, the frame 2 is rectangular and is made of aluminum. The frame 2 includes a top plate 2a, right and left side plates 2b, and a bottom plate 2c. Auxiliary plates 4 are provided on the right and left sides of the bottom plate 2c. The top plate 2a, the side plates 2b, and the bottom plate 2c may be integrally formed, or may be separately provided.

The main display unit 3 includes a casing 5, a liquid crystal panel 6, an inner cover 7, and a rear cover 8.

The casing 5 is made of, for example, a resin material, and is composed of a front case 9 opened rearward and a rear case 10 opened forward, as shown in FIGS. 2 to 6. The front case 9 and the rear case 10 are combined in the front-rear direction.

The front case 9 includes a front face 11, an upper face 12 protruding rearward from an upper edge of the front face 11, side faces 13 protruding rearward from right and left edges of the front face 11, and a lower face 14 protruding rearward from a lower edge of the front face 11. The front face 11 has a panel mounting opening 11a. Sound output portions 11b are provided, respectively, at right and left lower ends of the front face 11.

Figure 7:
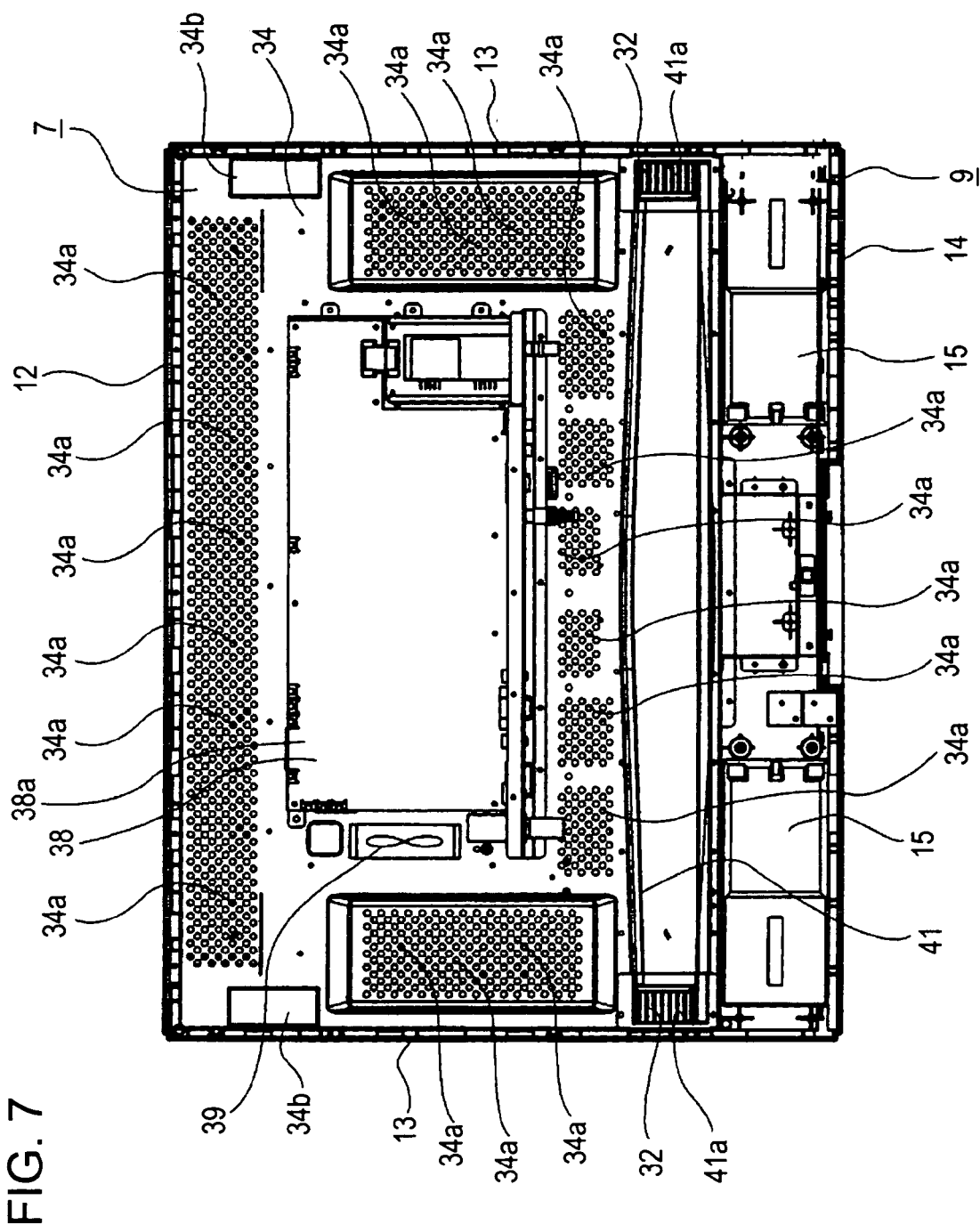
FIG. 7 is a rear view of the display device from which the frame, a rear case, and a cover are removed.
Figure 8:
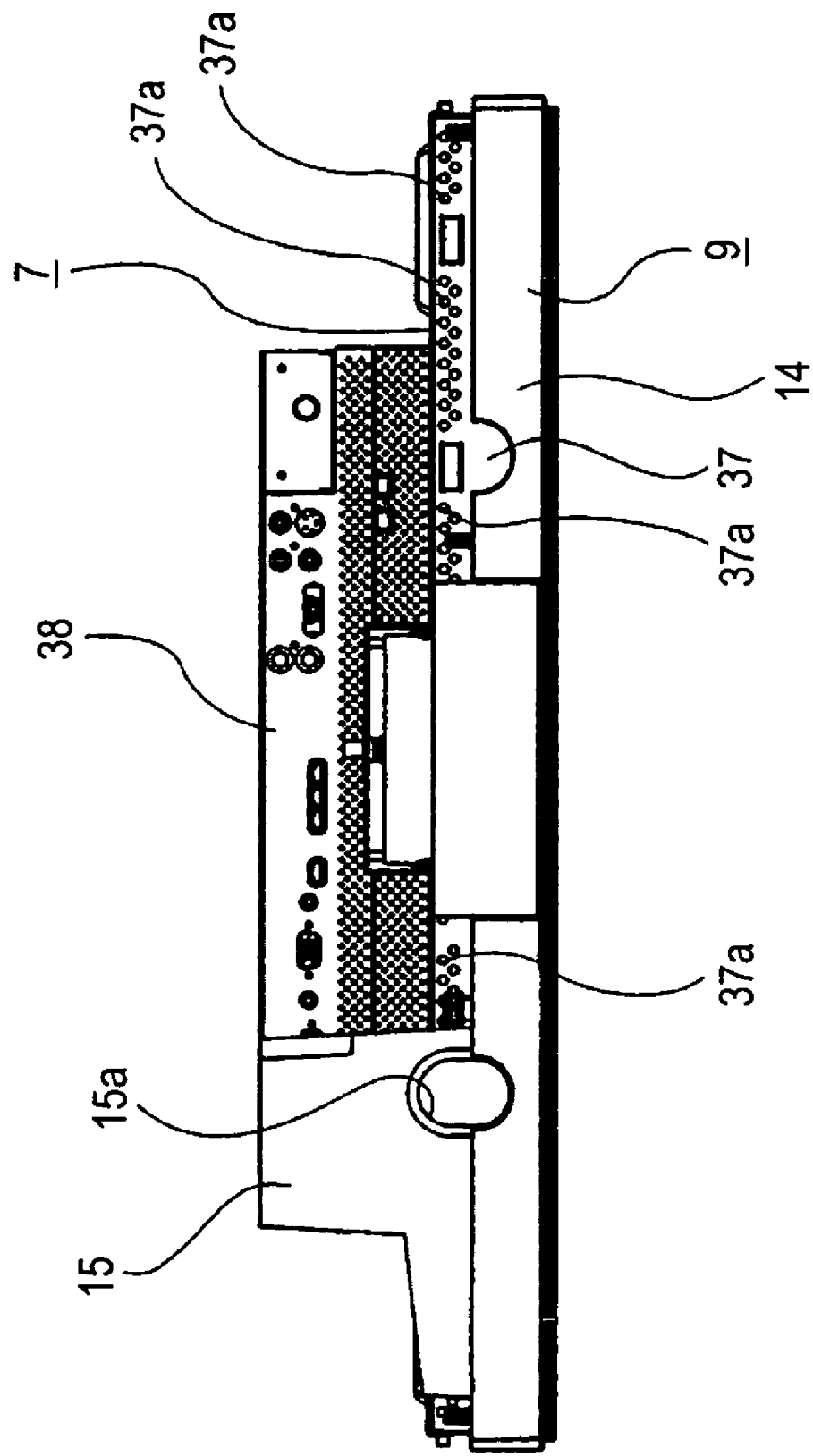
FIG. 8 is a bottom view of the display device from which the frame, the rear case, and the cover are removed and one speaker is omitted.

Speakers 15 are disposed at right and left lower ends of a rear side of the front face 11, as shown in FIGS. 2, 7, and 8. The speakers 15 respectively have sound output holes 15a. One of the sound output holes 15a (not shown) outputs sound forward, and the other (shown in FIG. 8) outputs sound downward.

The rear case 10 includes a front case portion 16 and a rear case portion 17. The front case portion 16 includes a rear face 18, an upper face 19 protruding forward from an upper edge of the rear face 18, side faces 20 protruding forward from right and left edges of the rear face 18, and a lower face 21 protruding forward from a lower edge of the rear face 18. The rear case portion 17 protrudes rearward from the rear face 18 of the front case portion 16 except the upper, right, and left edges, and includes a rear face 22, an upper face 23, side faces 24, and a lower face 25.

Figure 3:
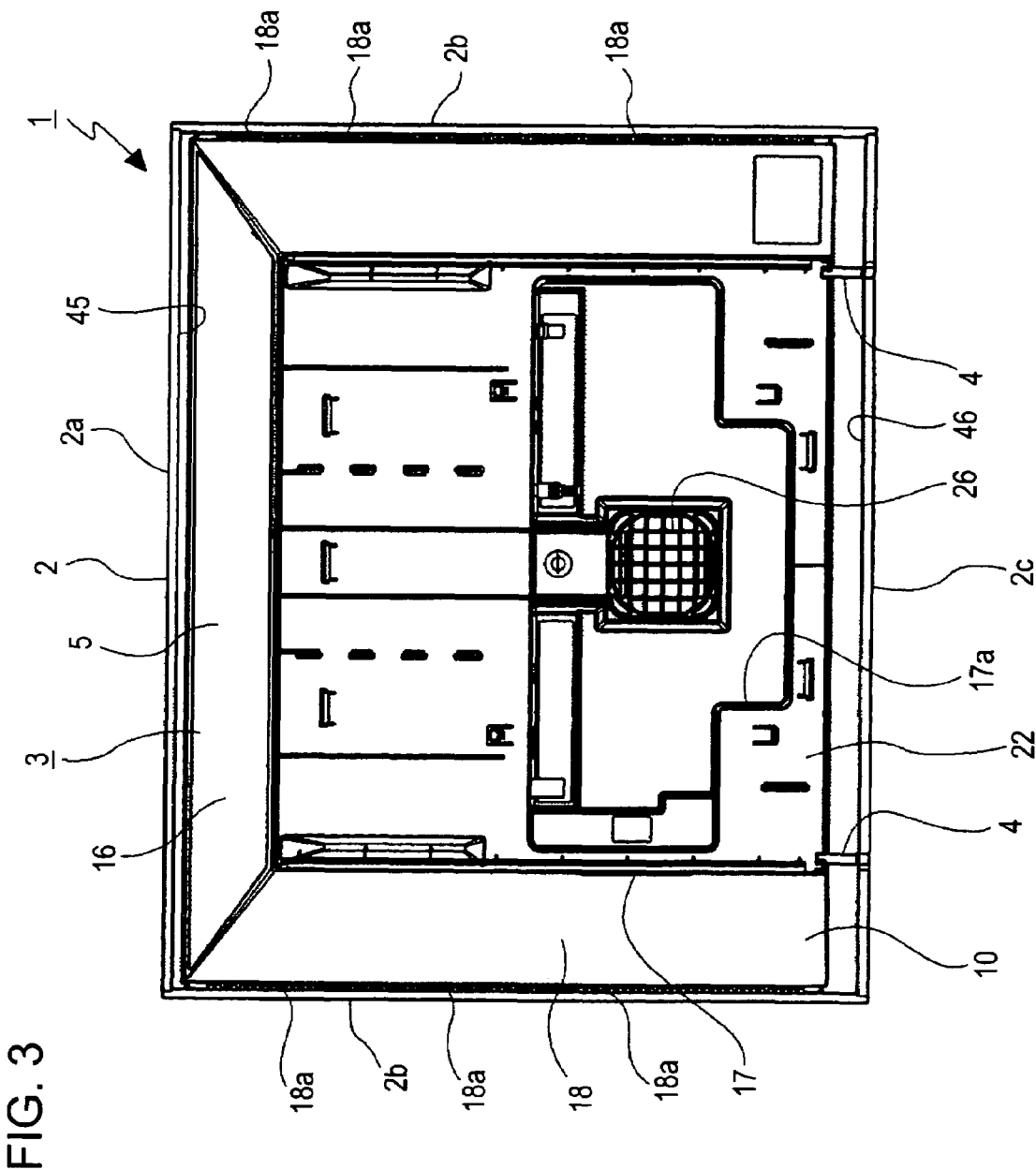
FIG. 3 is a rear view of the display device from which a rear cover is removed.
Figure 5:
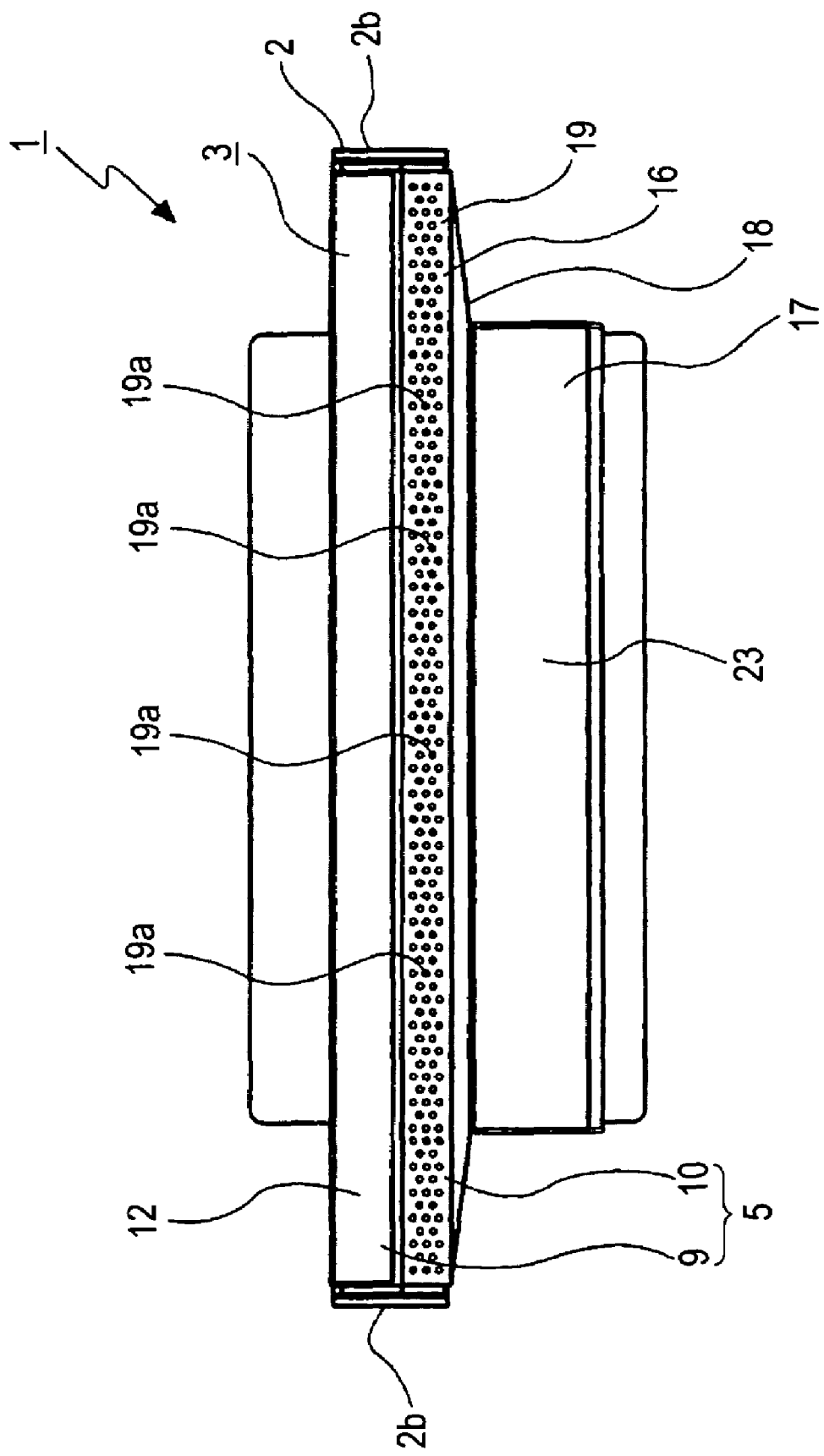
FIG. 5 is a plan view of the display device from which a top plate of a frame is removed.

Air intake holes 18a are vertically arranged at right and left edges of the rear face 18 of the front case portion 16, as shown in FIGS. 1 and 3. Radiation holes 19a are provided on the entire upper face 19 of the front case portion 16, as shown in FIGS. 2 and 5.

Figure 4:
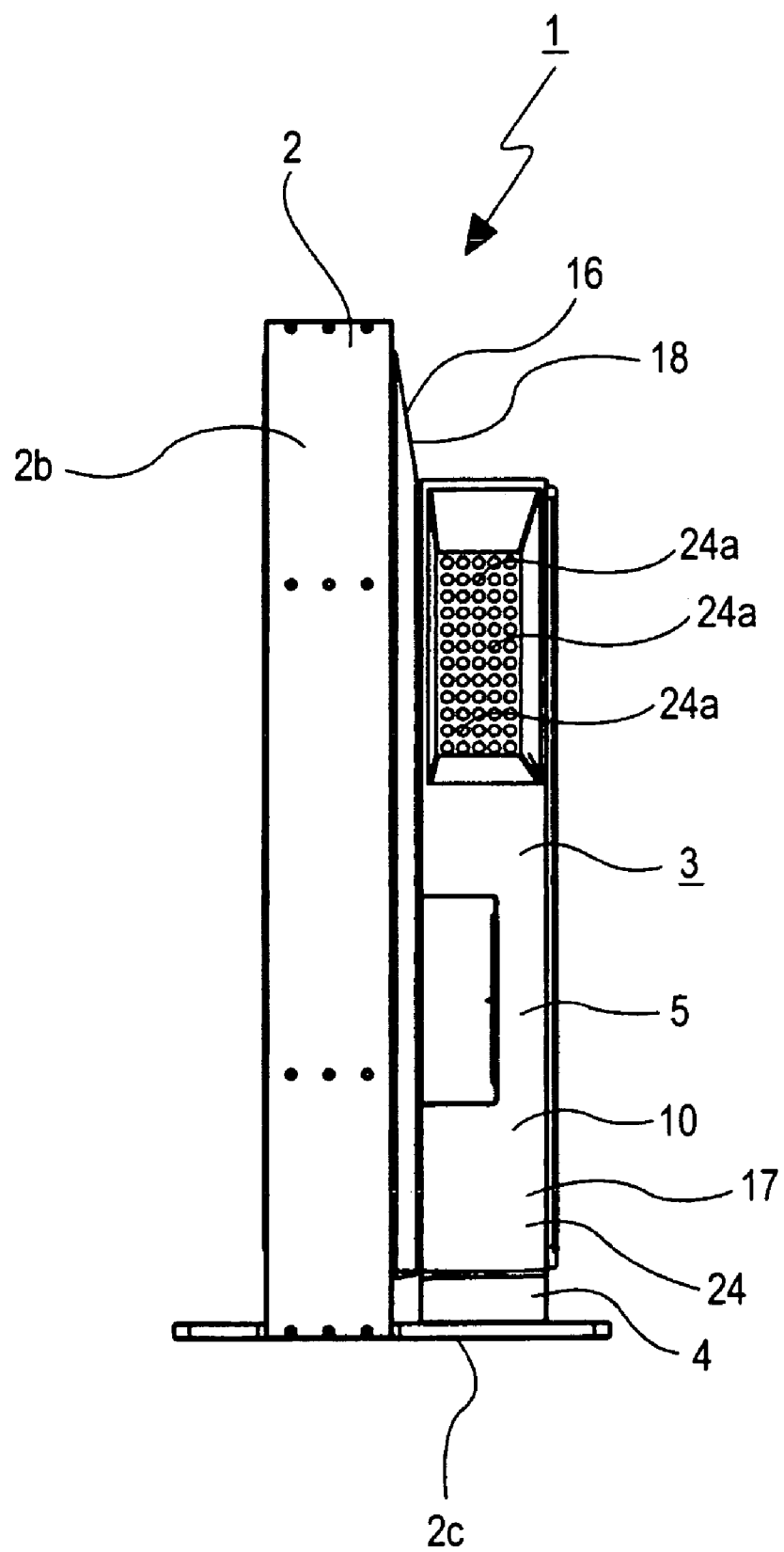
FIG. 4 is a side view of the display device.

Air intake holes 24a and air exhaust holes 24b are provided on the side faces 24 of the rear case portion 17, as shown in FIGS. 1 and 4. Air intake holes 25a are provided on the lower face 25 of the rear case portion 17, as shown in FIG. 6.

A recess 17a is provided in the rear case portion 17 so as to be opened rearward, as shown in FIG. 3. A fan air inlet 26 is provided in the recess 17.

Figure 6:
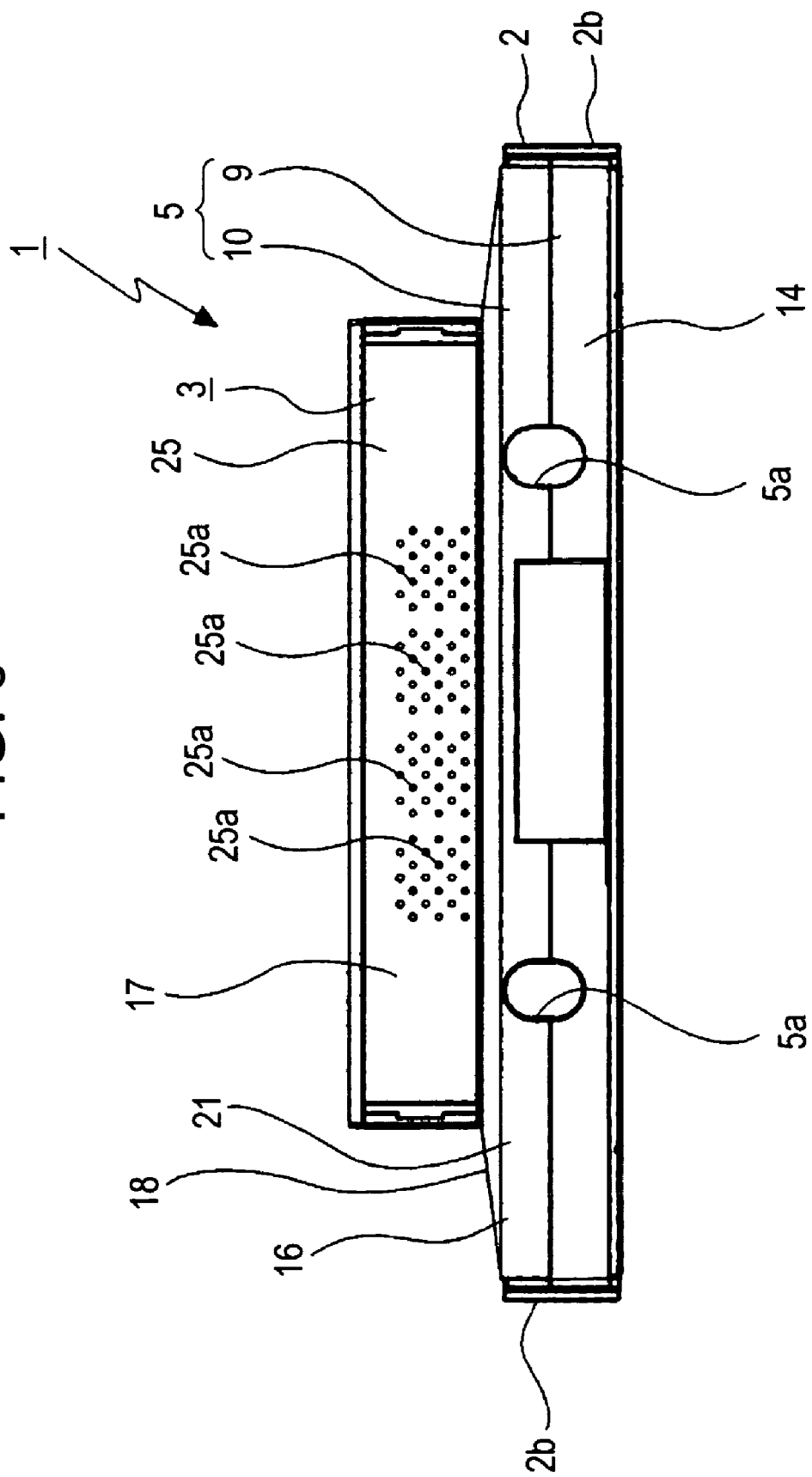
FIG. 6 is a bottom view of the display device from which a bottom plate of the frame is removed.

Right and left sound holes 5a are provided in the lower face of the casing 5, as shown in FIG. 6.

Figure 9:
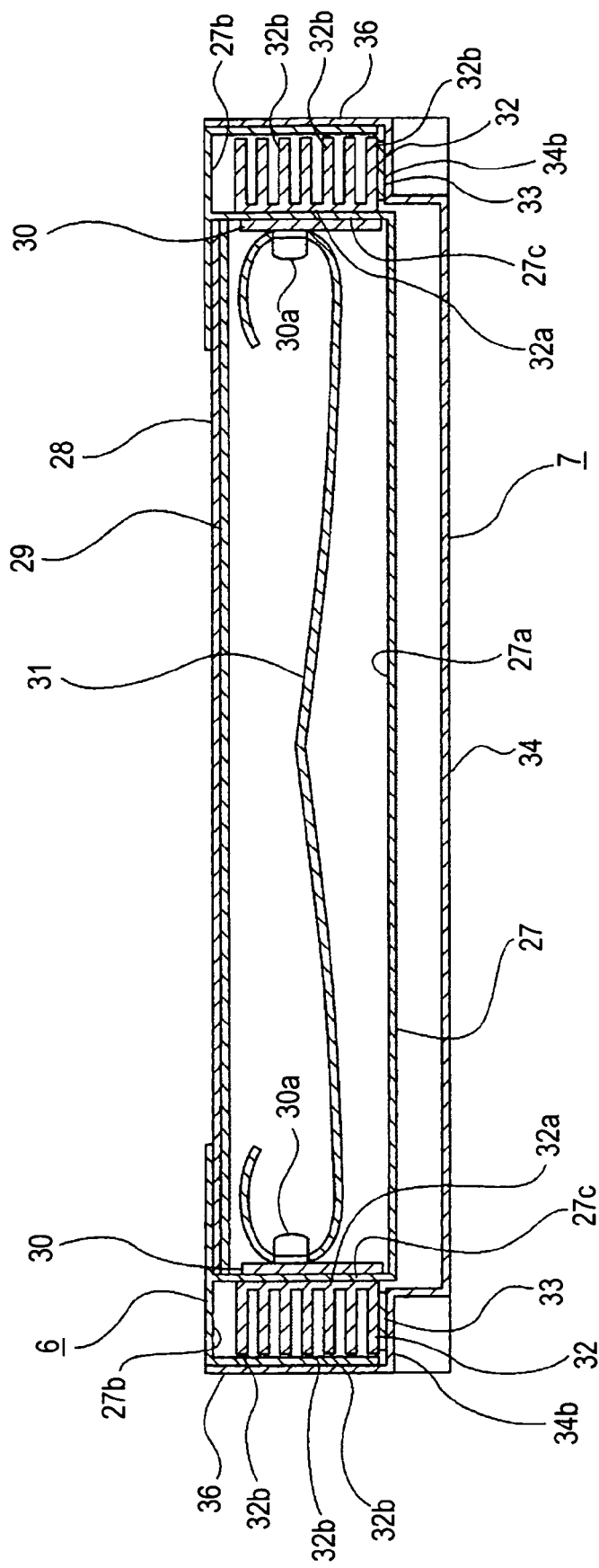
FIG. 9 is a schematic sectional view of a liquid crystal panel and an inner cover.

The liquid crystal panel 6 includes a panel case 27 and a display panel 28 disposed therein, as shown in FIGS. 2 and 9.

The panel case 27 is made of a metal material having high thermal conductivity, and includes a panel mounting recess 27a opened forward, and heat-sink mounting recesses 27b provided on right and left sides of the panel mounting recess 27a so as to be opened rearward and upward. The panel mounting recess 27a is separated from the heat-sink mounting recesses 27b by partitions 27c.

The display panel 28 and a diffusing plate 29 are arranged in the front-rear direction on the front side of the panel mounting recess 27a to display an image. Vertical control circuit boards 30 are mounted on inner surfaces of the partitions 27c. Light sources 30a, such as LEDs (light emitting diodes), are vertically arranged at regular intervals on the control circuit boards 30 to emit light as backlight.

A heat conductive plate, such as an aluminum plate, and a heat conductive sheet, which are made of a metal material having high thermal conductivity, are stuck on surfaces of the control circuit boards 30 remote from the light sources 30a. The control circuit boards 30 are in contact with the partitions 27a with the heat conductive plate and the heat conductive sheet disposed therebetween.

A reflector 31 is disposed in the panel mounting recess 27a. Light emitted from the light sources 30a is reflected in a predetermined direction by the reflector 31, is diffused by the diffusing plate 29, and then enters the display panel 28.

Figure 10:
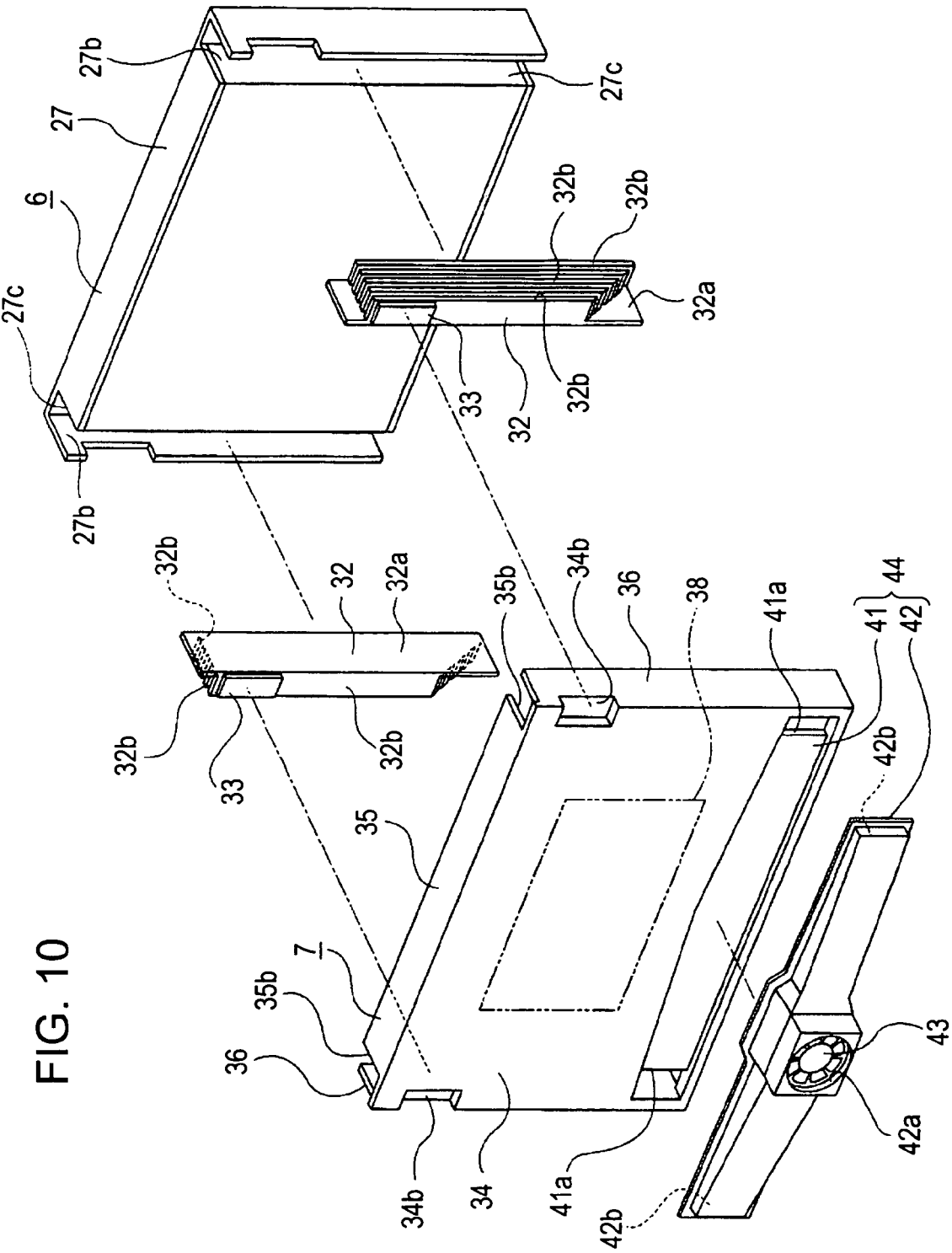
FIG. 10 is an exploded perspective view of the liquid crystal panel, the inner cover, heat sinks, and an air intake cover.
Figure 11:
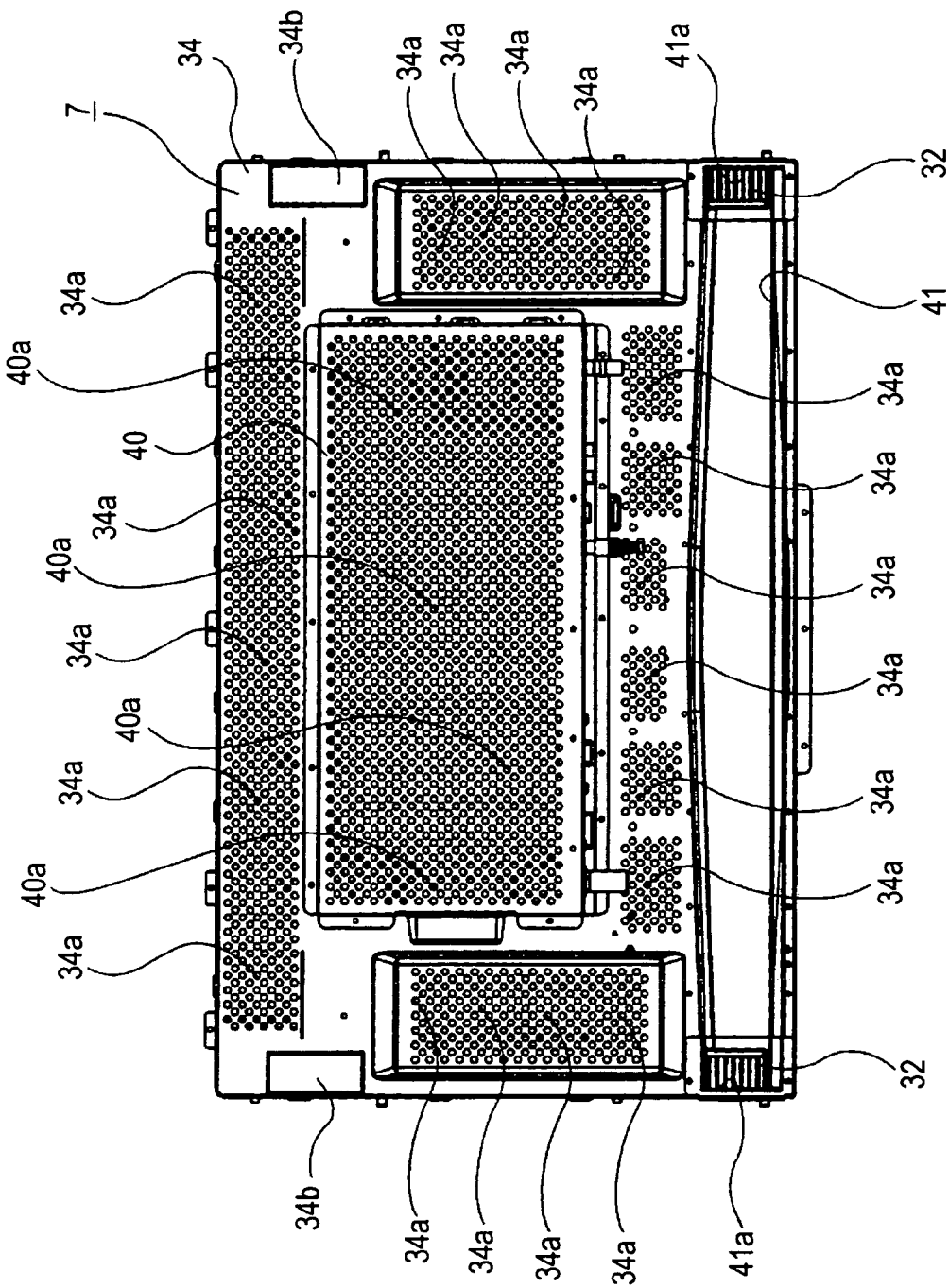
FIG. 11 is a rear view of the display device, showing a state in which the inner cover and the cover are attached to the liquid crystal panel.

As shown in FIGS. 9 and 10, vertical heat sinks 32 are respectively disposed in the heat-sink mounting recesses 27b. In each of the heat sinks 32, a base face 32a facing in the right-left direction is provided integrally with fins 32b protruding outward (sideward) therefrom. The fins 32b are arranged at regular intervals in the front-rear direction.

Upper ends of the fins 32b are aligned at the same height, but the lengths thereof are set to be different so that each fin is shorter than a fin disposed in front thereof. That is, the forefront fin 32b is the longest, and the rearmost fin 32b is the shortest.

A heat conductive sheet (not shown) is stuck on the base face 32a of each heat sink 32, and the base face 32a is provided on the outer side of the partition 27c of the panel case 27 with the heat conductive sheet disposed therebetween. Therefore, heat generated at the light sources 30a and the control circuit boards 30 is conducted to the heat sinks 32 after sequentially passing through the heat conductive plates, the heat conductive sheets, the partitions 27c, and the heat conductive sheets.

In each heat sink 32, a heat conductive sheet 33 is stuck on an upper portion of the rearmost fin 32b, as shown in FIGS. 9 and 10.

The inner cover 7 is made of a metal material having thermal conductivity, and is shaped like a shallow box opened forward, as shown in FIG. 2. The inner cover 7 includes a rear wall 34, an upper wall 35, side walls 36, and a lower wall 37, as shown in FIGS. 11 to 15.

A control circuit section 38 having a control board 38a is provided at the rear center of the rear wall 34, as shown in FIGS. 7 and 8. The circuit control section 38 serves to execute image control on the display panel 28 and power control on the components. An air intake fan 39 is disposed beside the control circuit section 38.

The control board 38a and the air intake fan 39 are covered with a cover 40, which is opened forward and downward, from the rear side. The cover 40 is attached to the rear wall 34, and includes a plurality of air supply and exhaust holes 40a, as shown in FIGS. 11 to 15.

Vent holes 34a are provided in the rear wall 34 of the inner cover 7, air outlets 35a are provided at the rear end of the upper wall 35, and air intakes 37a are provided at the rear end of the lower wall 37.

Contact projections 34b projecting forward are provided at right and left ends near the upper end of the rear wall 34, as shown in FIGS. 9 and 10. In a state in which the inner cover 7 is attached to the liquid crystal panel 6, the contact projections 34b are in contact with the heat conductive sheets 33 stuck on the heat sinks 32.

A duct groove 41 opened rearward extends in the right-left direction at the lower end of the rear wall 34. The rear wall 34 also includes communicating holes 41a that communicate with right and left ends of the duct groove 41. In a state in which the inner cover 7 is attached to the liquid crystal panel 6, the communicating holes 41a communicate with the heat-sink mounting recesses 27b of the panel case 27.

Figure 16:
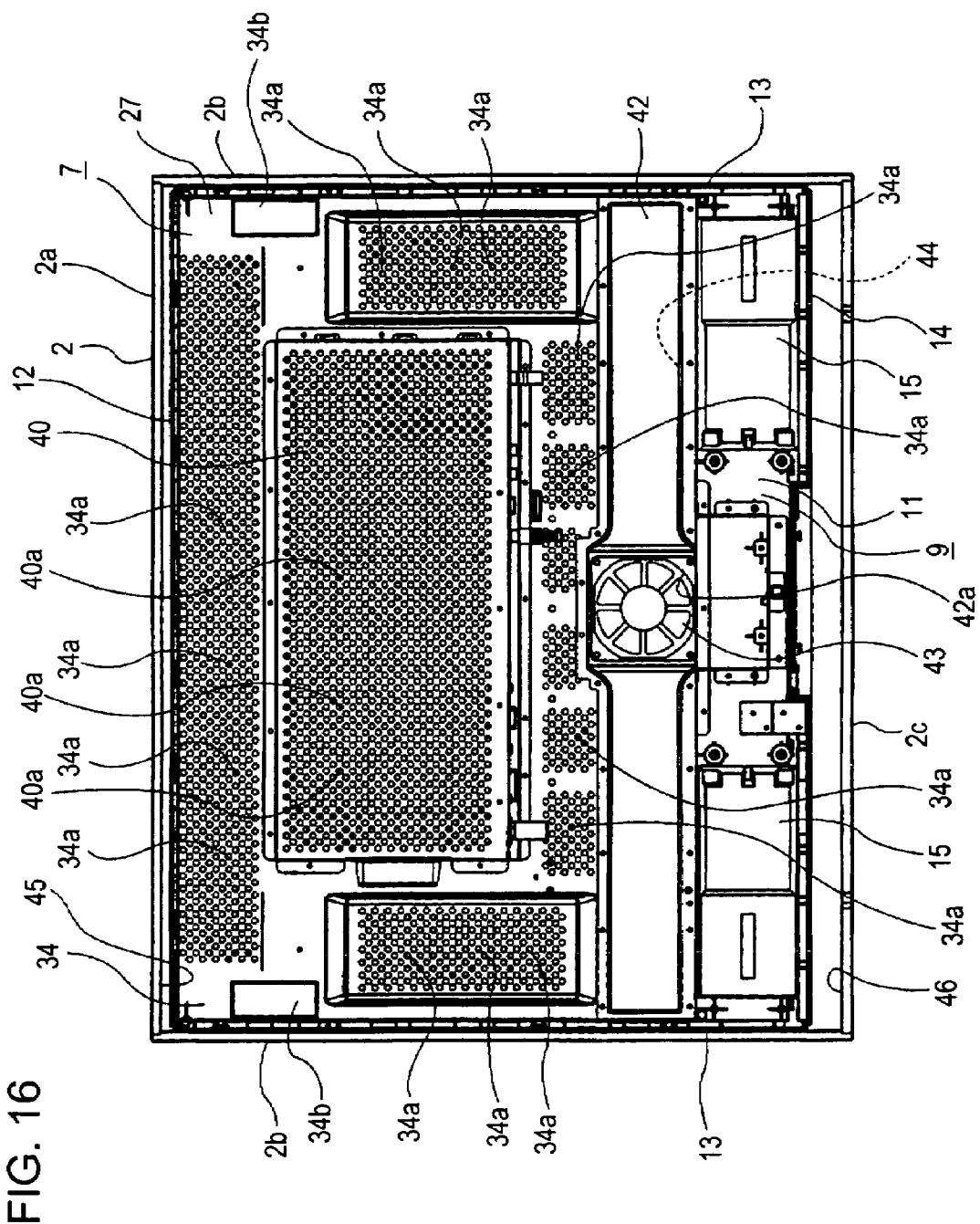
FIG. 16 is a rear view of the display device from which the rear case is removed.

A horizontal air intake cover 42 is mounted on the rear wall 34 to close the duct groove 41, as shown in FIGS. 10 and 16. The air intake cover 42 has an air inlet 42a at its center, and air outlets 42b at its right and left ends. A fan 43 is disposed inside the air inlet 42a.

When the air intake cover 42 is attached to the rear wall 34, a duct 44 for feeding cooling air to the heat sinks 32 is defined between the air inlet 42a and the air outlets 42b by the duct groove 41 and the air intake cover 42, and the air outlets 42b communicate with the communicating holes 41a of the rear wall 34. Therefore, the duct 44 communicates with the heat-sink mounting recesses 27b of the panel case 27.

Figure 12:
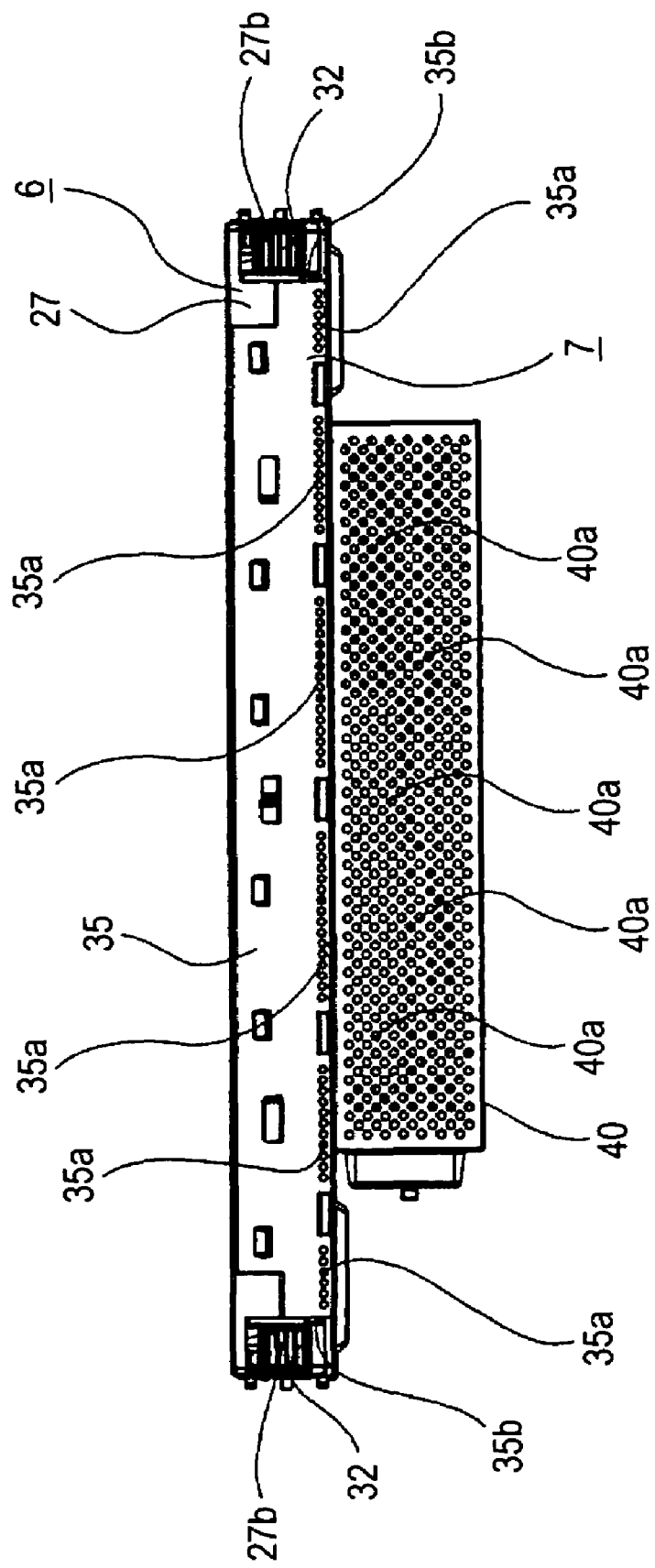
FIG. 12 is a plan view of the display device shown in FIG. 11.
Figure 13:
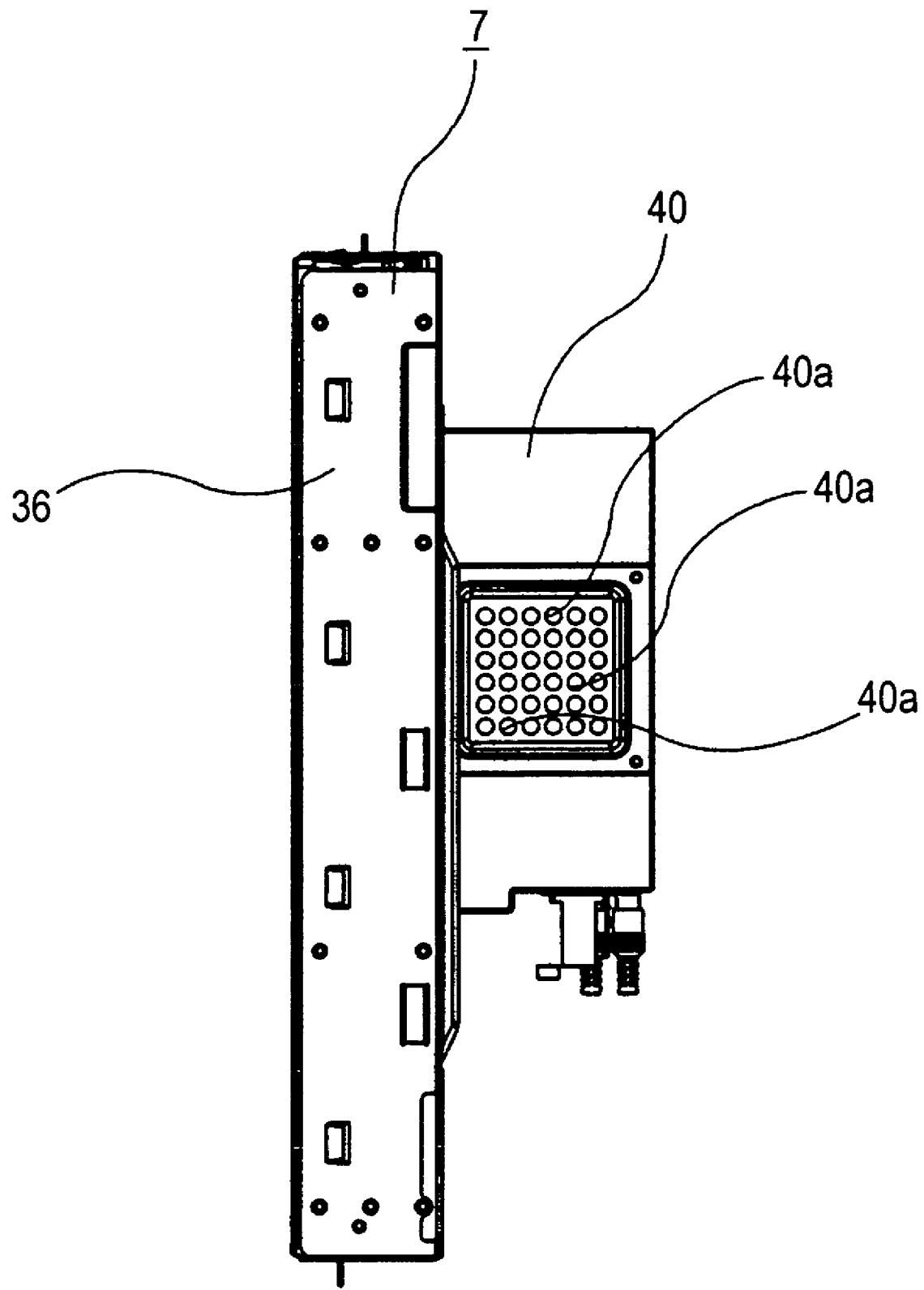
FIG. 13 is a one-side view of the display device.
Figure 14:
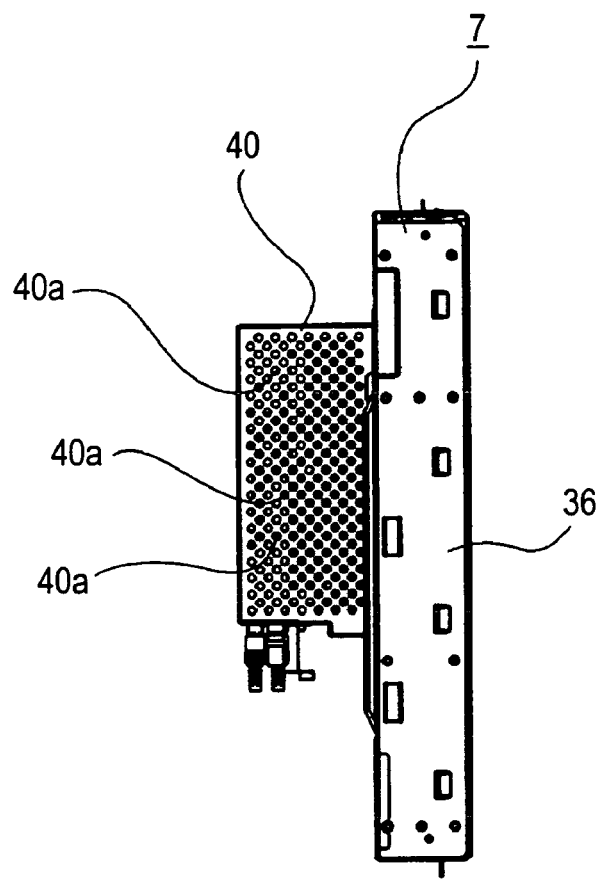
FIG. 14 is the-other side view of the display device.
Figure 15:
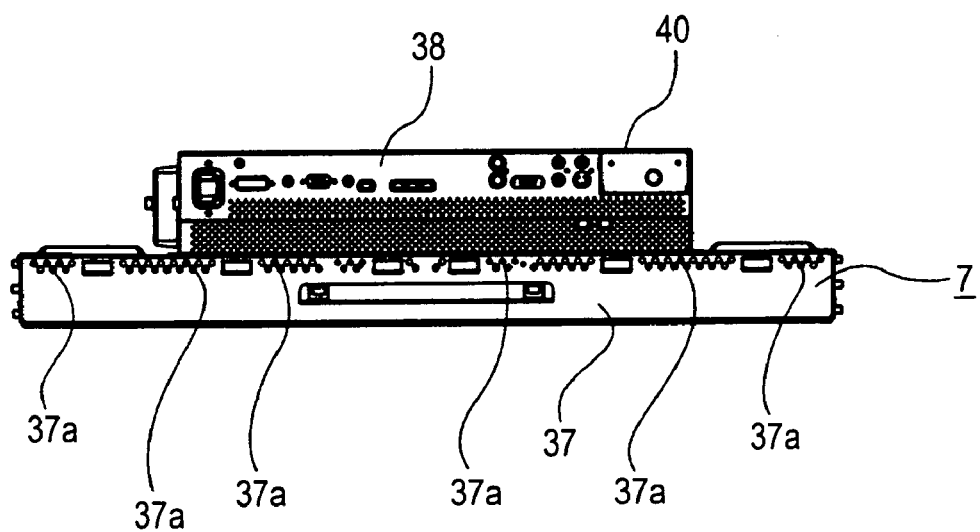
FIG. 15 is a bottom view of the display device.

Air exhaust cutouts 35b are provided at right and left ends of the upper wall 35 of the inner cover 7, as shown in FIGS. 2 and 12. In a state in which the inner cover 7 is attached to the liquid crystal panel 6, the air exhaust cutouts 35b are placed on the heat-sink mounting recesses 27b of the panel case 27.

The rear cover 8 has air intake holes 8a, as shown in FIG. 1.

A description will be given below of the manner in which the main display unit 3 is assembled.

First, the inner cover 7 is attached to the liquid crystal panel 6 from the rear side. In this state, right and left side faces of the panel case 27 of the liquid crystal panel 6 are in contact with the inner sides of the side walls 36 of the inner cover 7, as shown in FIG. 9. Therefore, heat generated at the light sources 30a and the control circuit boards 30 is conducted to the heat sinks 32, as described above, and is also conducted from the panel case 27 to the inner cover 7 so as to radiate outside.

In the above-described state in which the liquid crystal panel 6 and the inner cover 7 are combined, the front case 9 and the rear case 10 are connected so as to cover the liquid crystal panel 6 and the inner cover 7. While the air intake cover 42 is mounted on the rear case 10, the rear cover 8 is attached to close the recess 17a of the rear case 10. In this way, the main display unit 3 is assembled.

The main display unit 3 is mounted inside the frame 2 so that the side faces 13 and 20 of the casing 5 are in contact with the side plates 2b, as shown in FIGS. 1 and 3. In this case, the main display unit 3 is placed on the auxiliary plates 4 provided on the bottom plate 2c of the frame 2.

While the main display unit 3 is mounted in the frame 2, a space 45 is formed between the upper surface of the casing 5 and the top plate 2a of the frame 2, and a space 46 is formed between the lower surface of the casing 5 and the bottom plate 2c of the frame 2.

When the display device 1 having the above-described configuration is driven, an image is displayed on the display panel 28. In this case, light serving as backlight is emitted from the light sources 30a. Heat generated at the light sources 30a and the control circuit boards 30 is conducted to the heat sinks 32, and is also conducted from the panel case 27 to the inner cover 7, as described above.

During driving of the display device 1, the fan 43 disposed in the air intake cover 42 is rotated to take outside air as cooling air into the duct 44 through the air intake holes 8a of the rear cover 8 and the air inlet 42a. The cooling air taken in the duct 44 is fed from the air outlets 42b to the heat-sink mounting recesses 27b of the panel case 27 through the communicating holes 41a to cool the heat sinks 32, and is then taken out through the radiation holes 19a of the rear case 10. Therefore, heat generated at the light sources 30a and the control boards 30 and conducted to the heat sinks 32 is radiated from the radiation holes 19a by the cooling air. The radiated heat is released into the air from the upper space 45 provided in the main display unit 3.

Since the top plate 2a of the frame 2 is placed above the main display unit 3, even when a user touches the top plate 2a, the heated cooling air will not be blown against the user. Moreover, the temperature of the top plate 2a does not extremely increase, and therefore, a large amount of heat is not conducted to the hand of the user.

The frame 2 disposed around the main display unit 3 also improves the appearance of the display device 1.

Outside air is also taken as cooling air into the casing 5 through the lower space 46 of the main display unit 3 and the air intake holes 25a of the casing 5. The taken cooling air cools the components disposed inside the casing 5, and is released outside from the space 45 through the radiation holes 19a of the casing 5.

During driving of the display device 1, the air intake fan 39 disposed inside the cover 40 is also rotated to take outside air as cooling air into the cover 40 from the air intake holes 24a of the rear case 10 through the air supply and exhaust holes 40a of the cover 40. The taken cooling air cools the control circuit section 38, and is released outside from the air supply and exhaust holes 40a of the cover 40 and the air exhaust holes 24b of the rear case 10.

Furthermore, sound is output from the sound output holes of the speakers 15 during driving of the display device 1. In this case, high-range and midrange sound is output forward from the unshown sound output hole through the sound output portions 11*b* of the front case 9, and low-range sound is output down toward the space 46 from the sound output hole 15*a* through the sound holes 5*a* of the casing 5.

The space 46 allows low-range sound to be output downward and to be thereby emphasized. The space 46 can serve both to take cooling air in and to output sound, and is effectively used.

Since the heat sinks 32 are provided on the right and left sides of the casing 5 in the display device 1, cooling air can flow from bottom to top. This enhances the cooling efficiency.

The fan 43 is provided to take outside air in as cooling air, and the cooling air is supplied to the heat sinks 32 by the duct 44. Therefore, the cooling air is forcedly fed to the heat sinks 33. This enhances cooling efficiency.

Since the lengths of the fins 32*b* of each of the heat sinks 32 are set so that the fin closest to the air outlet 42*b* of the duct 44 is the shortest and the fin farthest from the air outlet 42 is the longest, cooling air is efficiently supplied between the fins 32*b* through the duct 44. This further enhances cooling efficiency.

Since cooling air taken in by the single fan 43 is fed to the right and left heat sinks 32 via the duct 44, the distance between the fan 43 and the air outlets 42*b*, where the channel for the cooling air is bent, is long. This reduces noise of the fan 43.

During driving of the display device 1, outside air is taken as cooling air into the heat-sink mounting recesses 27*b* of the panel case 27 from the air intake holes 18*a* provided at the right and left ends of the rear face 18 of the casing 5. Therefore, the efficiency of cooling the heat sinks 32 can be enhanced.

While the heat sinks 32 are disposed at the right and left ends of the casing 5 in the above embodiment, they may be disposed at other positions.

For example, another heat sink may be provided in front of and opposed to the fan 43, in addition to the heat sinks 32, and may be connected to the heat sinks 32 by a heat pipe for heat transfer.

It should be understood that the specific shapes and structures of the components described in the above best mode are exemplary, and are not intended to limit the technical scope of the present invention.

What is claimed is:

1. A display device comprising:
    a main display unit including a casing, a display panel disposed on a front side of the casing to display an image, a light source for emitting light serving as backlight, and a reflector for reflecting the light emitted from the light source toward the display panel;
    a heat sink for cooling the light source, the heat sink having a plurality of fins; and
    a frame provided to cover at least an upper face and right and left side faces of the casing from the outside, and having a top plate disposed above the upper face and a pair of side plates disposed beside the right and left side faces,
    wherein a radiation hole is provided in the upper face of the casing so that at least heat conducted from the light source to the heat sink radiates therethrough, and
    wherein a radiation space is provided between the top plate of the frame and the upper face of the casing.

2. The display device according to claim 1, wherein the heat sink is disposed on each of right and left sides of the casing.

3. The display device according to claim 1, further comprising:
    a fan for taking outside air in as cooling air; and
    a duct for feeding the cooling air to the heat sink, the duct including one end serving as an air inlet connected to the fan and the other end serving as an air outlet for feeding the cooling air toward the heat sink.

4. The display device according to claim 3, wherein the heat sink is placed so that the fins are arranged in a direction in which the cooling air is blown from the air outlet of the duct, one longitudinal end of the heat sink opposes the air outlet, and the positions of ends of the fins at the longitudinal end of the heat sink are determined in accordance with the distance from the air outlet so that the fin closest to the air outlet is the shortest and the fin farthest from the air outlet is the longest.

5. A display device comprising:
    a main display unit including a casing, a display panel provided on a front side of the casing to display an image, a light source for emitting light serving as backlight, and a reflector for reflecting the light emitted from the light source toward the display panel; and
    a frame provided to cover at least a lower face and right and left side faces of the casing from the outside, and having a bottom plate disposed under the lower face and a pair of side plates disposed beside the right and left side faces,
    wherein an air intake hole is provided in the lower face of the casing to take outside air in as cooling air, and
    wherein an air intake space is provided between the bottom plate of the frame and the lower face of the casing.

6. The display device according to claim 5, wherein a speaker is provided at a lower end of the casing, and has a sound output hole opened downward to output at least low-range sound.

* * * * *